United States Patent
Bendak et al.

(10) Patent No.: US 6,873,605 B1
(45) Date of Patent: Mar. 29, 2005

(54) BIDIRECTIONAL LINE SWITCH RING SYSTEM AND METHOD

(75) Inventors: George Beshara Bendak, San Diego, CA (US); Alan Michael Sorgi, San Diego, CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 730 days.

(21) Appl. No.: 09/753,183

(22) Filed: Jan. 2, 2001

(51) Int. Cl.⁷ .................................................. H04B 1/44
(52) U.S. Cl. ........................................ 370/282; 398/3
(58) Field of Search ................................ 370/216–228, 370/241–252, 389, 395.32, 402–6, 276, 282–296; 375/211–214; 398/1–7, 41–45, 50, 59, 67, 192, 173–176, 182–3

(56) References Cited

U.S. PATENT DOCUMENTS

| | | |
|---|---|---|
| 5,251,205 A | 10/1993 | Callon et al. |
| 5,490,252 A | 2/1996 | Macera et al. |
| 5,568,471 A | 10/1996 | Hershey et al. |
| 5,661,763 A | 8/1997 | Sands |
| 5,666,108 A | 9/1997 | Duffy |
| 5,778,000 A | 7/1998 | Dosiere et al. |
| 5,793,976 A | 8/1998 | Chen et al. |
| 5,854,699 A | 12/1998 | Olshansky |
| 5,875,396 A | 2/1999 | Stockton et al. |
| 5,982,743 A | 11/1999 | Kusano |
| 6,006,069 A | 12/1999 | Langston |
| 6,587,470 B1 * | 7/2003 | Elliot et al. ................ 370/404 |
| 6,658,013 B1 * | 12/2003 | de Boer et al. ............ 370/404 |
| 6,690,884 B1 * | 2/2004 | Kelty et al. .................... 398/27 |
| 2003/0142678 A1 * | 7/2003 | Chan et al. ................ 370/395.1 |

* cited by examiner

Primary Examiner—David R. Vincent
(74) Attorney, Agent, or Firm—Incaplaw; Terrance A. Meador

(57) ABSTRACT

A system and method is provided which describe a self-healing bidirectional lines switch ring (BLSR) communication node. Two interconnected relay elements, having default and duplex input and output ports, enable bidirectional communications through a node. In the event of a ring failure, the relays can be enabled to return communications to a source node so that the ring remains unbroken.

6 Claims, 6 Drawing Sheets

BIDIRECTIONAL LINE SWITCH RING SYSTEM AND METHOD

RELATED APPLICATIONS

This application contains material related to the following commonly assigned U.S. patent applications incorporated herein by reference:

Ser. No. 09/753,135 filed 2 Jan. 2001 for "SYSTEM AND METHOD FOR REDUNDANT PATH CONNECTIONS IN DIGITAL COMMUNICATIONS NETWORK";

Ser. No. 09/753,134 filed 2 Jan. 2001 for "SYSTEM AND METHOD FOR DIAGNOSTIC MULTICAST SWITCHING".

BACKGROUND OF THE INVENTION

1. Field of the Invention

This invention relates generally to bidirectional line switch ring (BLSR) communications and, more particularly, to a system and method for using integrated circuit (IC) relay devices in the formation of a self-healing BLSR network.

2. Description of the Related Art

FIG. 1a is a schematic block diagram of a bidirectional line switch ring (prior art). Communications networks often connect nodes with bidirectional communications, to form a ring of nodes. One well-known example is the synchronous optical network (SONET). Bidirectional line switch rings are a method of SONET transport where part of the communications are sent clockwise over a first fiber and the rest of the communications are sent counter-clockwise over a second fiber.

FIG. 1b is a schematic block diagram of FIG. 1a where the ring has been broken due to a faulty fiber or broken node (prior art). Protection fibers 10 and 12 are shown that heal the ring by permitting communications to travel around the ring in the opposite direction.

Protection fiber systems can be enabled in software, however, the solution is complex and requires a complete knowledge of the network fiber system before installation. Alternately, redundant nodes can be provided in the network. However, the hardware can be expensive. Further, the solutions must be done at the box or system level. This type of redundancy can be a problem where space and power consumption are concerns. There is no standard practice redundancy practice in the implementation of BLSR networks.

It would be advantageous if a healing function could be easily implemented in ring network architecture.

It would be advantageous if the BLSR healing function could be implemented at the IC level to save space and switching complexity.

SUMMARY OF THE INVENTION

This invention is an IC relay device system that makes use of programmable features that allow the user to set the active data paths through the device and to monitor the possible data paths for integrity. In addition to this, it is possible to connect any input data path to any output data path while selectively bypassing the internal circuitry, to aid in network diagnostics as well as board level debug operations. More specifically, the invention has two identical inputs and two identical outputs, as well as two main blocks within the device, one for encoding and one for decoding. The input, output, and block connects are programmable. In one aspect of the invention, the relay devices are programmed to be a self-healing BLSR. If the transmit part of a ring breaks, the device can close the return path so that there is always a return connection in the network.

A method is also provided for forming a bidirectional line switch ring (BLSR) using a pair of integrated circuit (IC) digital communication relay devices. The method comprises: receiving bidirectional communications; for each relay device, selecting an input path to accept the received communications; and, for each relay device, selecting an output path to supply bidirectional communications. More specifically, the method comprises: selecting a mode of operation; and, selectively connecting the default and duplex input paths, for each relay device, in response to selecting the mode of operation. Additional details of the BLSR system and method follow.

DETAILED DESCRIPTION OF THE PREFERRED EMBODIMENTS

Figure 1B:
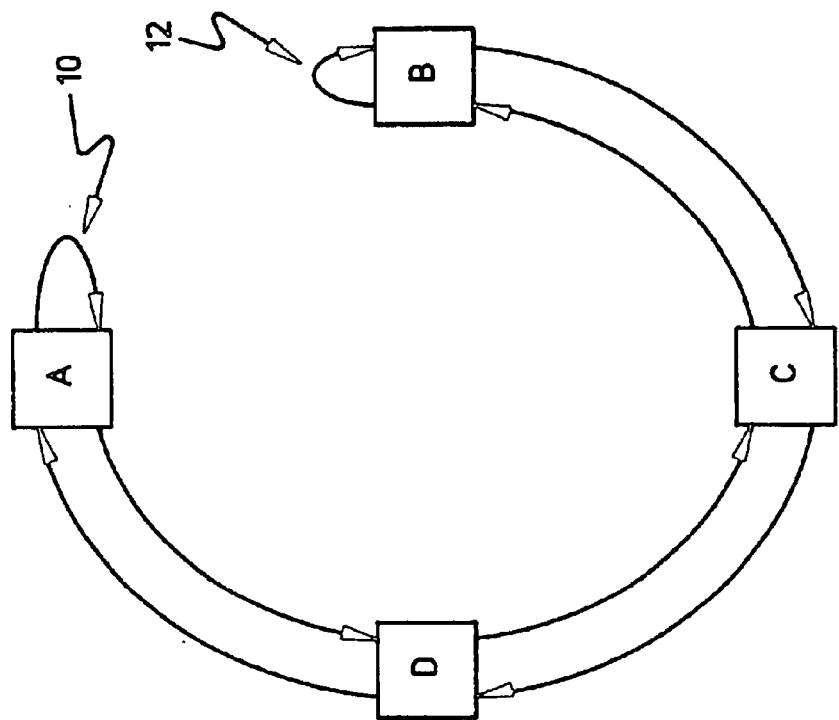
FIG. 1b is a schematic block diagram of FIG. 1a where the ring has been broken due to a faulty fiber or broken node (prior art).
Figure 1A:
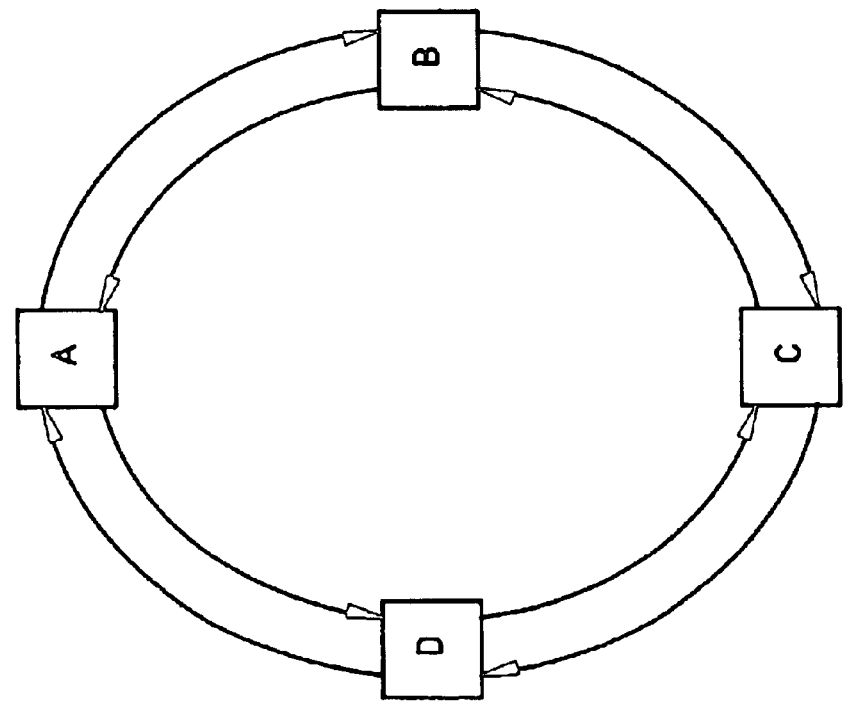
FIG. 1a is a schematic block diagram of a bidirectional line switch ring (prior art).
Figure 2:
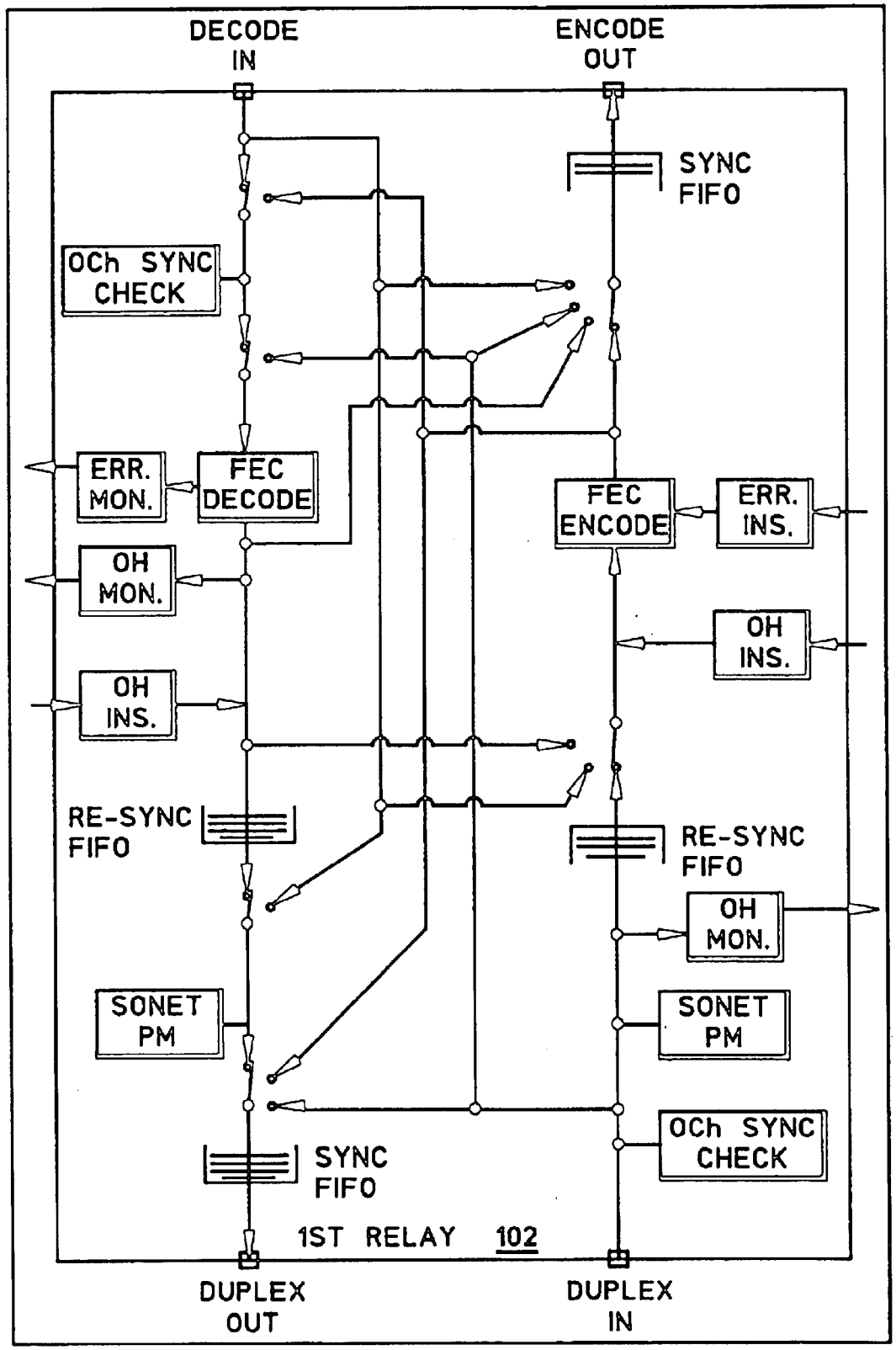
FIG. 2 is a detailed schematic block diagram of the present invention IC relay device.

FIG. 2 is a detailed schematic block diagram of the present invention IC relay device. This figure can be consulted for details of the relay node described below.

Figure 3:
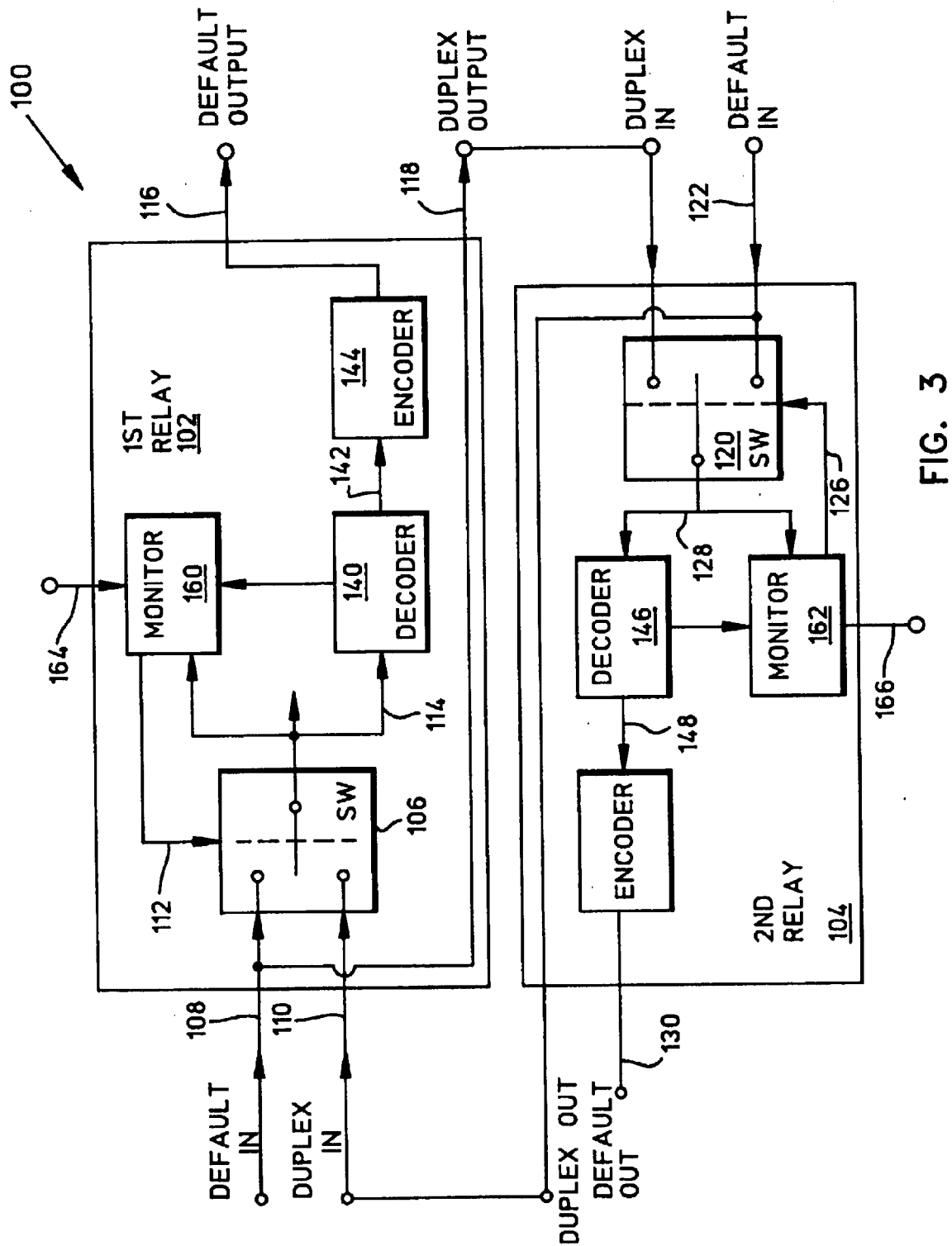
FIG. 3 is a schematic block diagram of the present invention BLSR system using a pair of IC relay devices.

FIG. 3 is a schematic block diagram of the present invention BLSR system using a pair of IC relay devices. The system 100 comprises a first relay 102 and a second relay 104. The first relay 102 includes an input switch 106 having a default input on line 108 and a duplex input on line 110 to receive communications. The input switch 106 also has a control port on line 112 to accept switch commands and an output on line 114 to supply the selected communications. The first relay also includes a default output on line 116 and a duplex output on line 118 connected to the default input.

Likewise, the second relay 104 includes an input switch 120 having a default input on line 122 and a duplex input on line 118 to receive communications. The input switch 120 has a control port on line 126 to accept switch commands and an output on line 128 to supply the selected communications. The second relay 106 has a default output on line 130 and a duplex output on line 110 connected to the default input.

Figure 4:
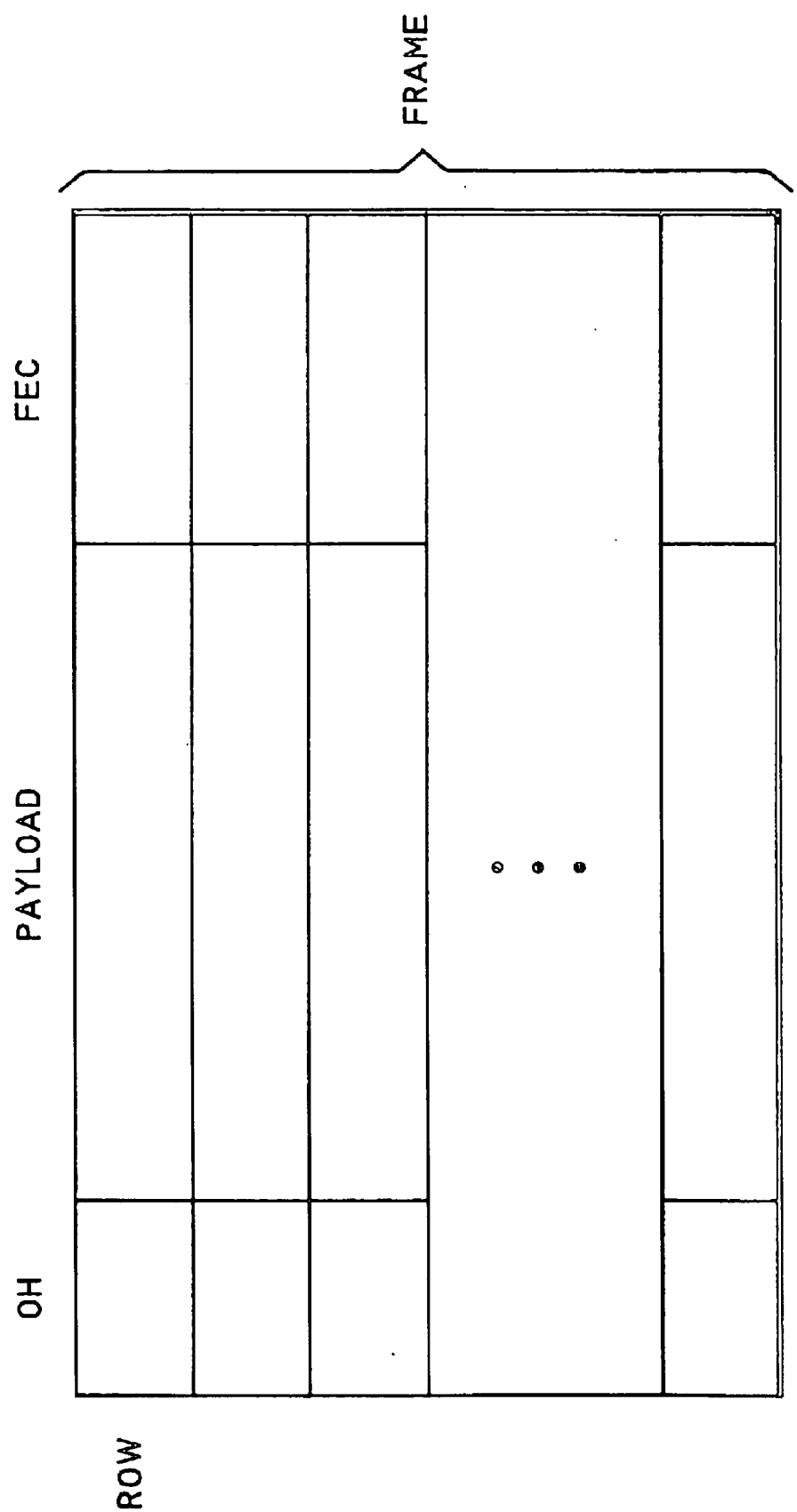
FIG. 4 is a diagram illustrating a digital wrapper or frame structure in which communications are embedded.

FIG. 4 is a diagram illustrating a digital wrapper or frame structure in which communications are embedded. Each frame includes a sub-frame which can be a row, or series of rows. Each row includes sections of overhead bytes, payload bytes, and forward error correction (FEC) bytes. One well-known FEC scheme, the Reed-Solomon (RS), includes coded information. Degraded information in the payload or overhead sections can be recovered using the decoded information in the FEC section. In some aspects of the invention, the received and transmitted communications are typically organized in a digital wrapper or frame structure that includes forward error correction (FEC).

The first relay 102 further includes a decoder 140 having a input connected to the input switch output on line 114. The decoder 140 supplies decoded and corrected communications at a decoder output on line 142. An encoder 144 has an input connected to the decoder output on line 142. The encoder 144 supplies encoded communications at an output connected to the first relay default output-on line 116.

Likewise, the second relay 104 includes a decoder 146 having a input connected to the input switch output on line 128. The decoder 146 supplies decoded and corrected communications at a decoder output on line 148. An encoder 150 has an input connected to the decoder output on line 140. The encoder 150 supplies encoded communications at an output connected to the second relay default output on line 130.

As shown in FIG. 3, the duplex output of the first relay is connected to the duplex input of the second relay on line 110. Likewise, the duplex output of the second relay is connected to the duplex input of the first relay on line 118.

In some aspects of the invention, a monitor circuit 160 in the first relay 102 and a monitor circuit 162 in the second relay circuit 104 are used to determine whether the links are healthy. The monitor 160/162 may determine health based upon encoded communications received on line 114/128. For example, the decision may be made based on the recognition of overhead bytes or frame synchronization bytes. The FEC communications are monitored for loss of signal, loss of clock, synchronization status (Loss of Frame and Out of Frame), and bit error rates (Signal Fail and Signal Degrade).

Alternately, the decision may be based upon information received from the decoder 144/146. For example, the decision may be based upon the number of corrections required in decoding the communications. Monitor 160 also has an external connection on line 164, and monitor 162 has an external connection of line 166. In some aspects of the invention, the health decision is made by a device (not shown) external to the relays 102/104. The decision is received via these external connections.

When the first, default mode of operation is selected, the bidirectional ring is operating normally. Clockwise communications are passed through first relay 102 and counterclockwise communications are passed through the second relay 104. When the first mode of operation is selected, the first relay input switch control port on line 112 accepts a command to select the default input on line 108. Then, the first relay 102 decodes, encodes, and supplies communications received on the input switch default input to the default output on line 116.

Likewise, the second relay input switch control port accepts a command on line 126 to select the default input on line 122. The second relay 104 decodes, encodes, and supplies communications received on the input switch default input to the default output on line 130.

When the second mode of operation is selected, the first relay input switch control port accepts a command on line 112 to select the duplex input. The first relay 102 decodes and encodes the communications, and the first relay 102 supplies communications received on the input switch duplex input on line 110 at the default output on line 118. Likewise, the second relay input switch control port accepts a command on line 126 to select the duplex input on line 118. The second relay 104 decodes and encodes the communications, and the second relay 104 supplies communications received on the input switch duplex input at the default output on line 110.

Thus, the first relay default input accepts communications on line 108, and supplies the communications at the duplex output 118. These communications are "returned" to the source on the default output of the second relay 104 on line 130. Likewise, the second relay input switch default input accepts communications on line 122, and supplies the communications at the duplex output on line 110. These communications are returned to their source on line 116 from the first relay 102. Alternately, the communications are returned to an intervening relay node and indirectly returned to the source.

Figure 5:
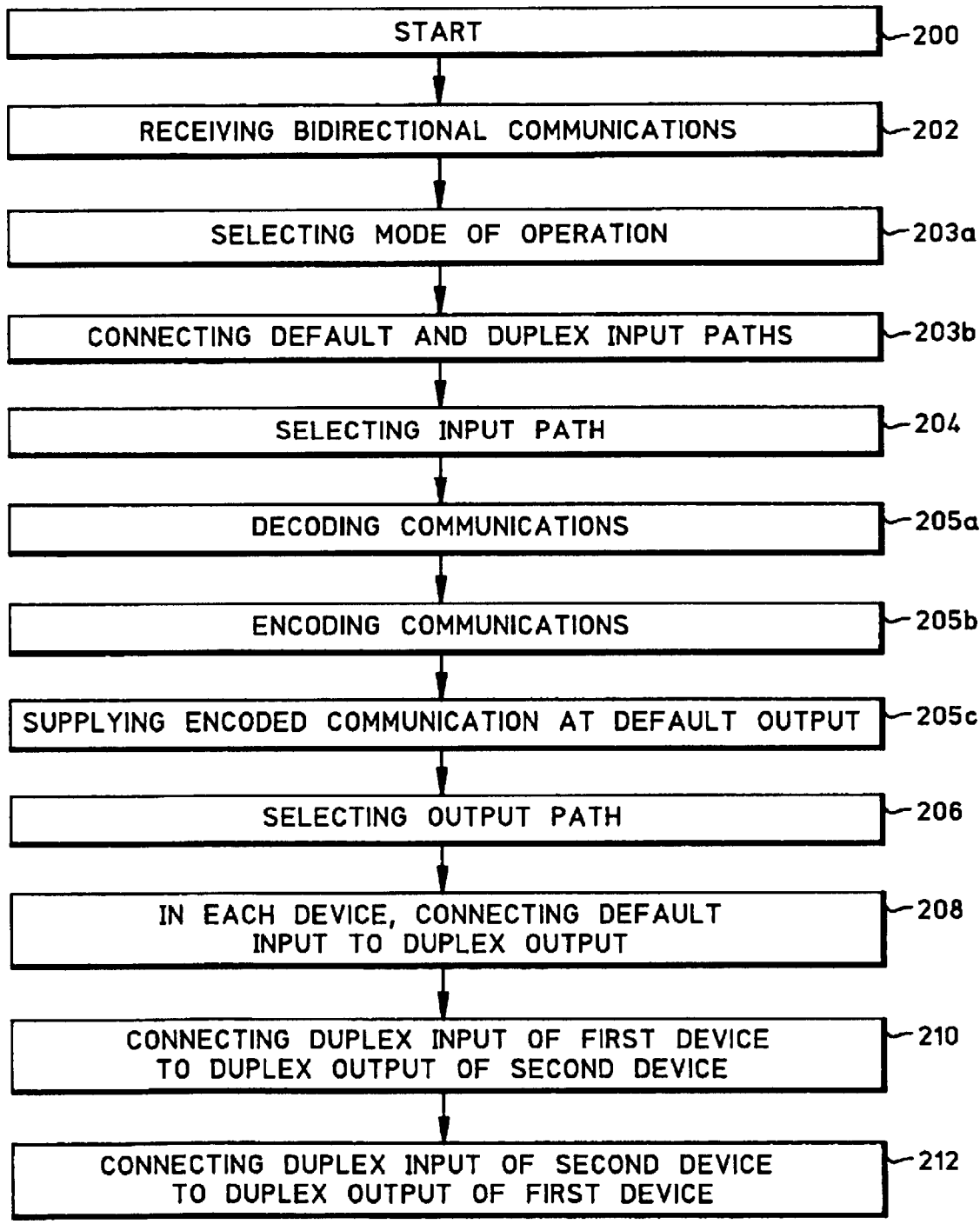
FIG. 5 is a flowchart depicting a method of forming a bidirectional line switch ring (BLSR) using a pair of integrated circuit (IC) digital communication relay devices.

FIG. 5 is a flowchart depicting a method of forming a bidirectional line switch ring (BLSR) using a pair of integrated circuit (IC) digital communication relay devices. Although the method is depicted as a series of numbered step for clarity, no order should be inferred from the numbering unless explicitly stated. The method begins with Step 200. Step 202 receives bidirectional communications. Step 204, for each relay device, selects an input path to accept the received communications for each relay device. Step 206, for each relay device, selects an output path to supply bidirectional communications for each relay device.

In some aspects of the invention, Step 203a selects a mode of operation. Step 203b selectively connects the default and duplex input paths, for each relay device, in response to selecting the mode of operation.

In some aspects, Step 205a decodes communications in response to the selecting of an input path. Step 205b encodes communications in response to selecting an input path.

In some aspects, Step 203a selects a first mode of operation. Step 203b, for each relay device, accepts communications on a default input for each relay device. Step 205a, decodes the communications. Step 205b encodes the communications. Step 205c supplies the encoded communications at a default output.

In some aspects, Step 203a selects a second mode of operation. For each relay device, Step 203b accepts communications on a duplex input. Step 205a decodes the communications. Step 205b encodes the communications. Step 205c supplies the encoded communications at a default output. For each relay device, Step 208 connects the default input to a duplex output. Step 210 connects the duplex input of a first device to the duplex output of a second device. Step 212 connects the duplex input of the second device to the duplex output of the first device.

Figure 6:
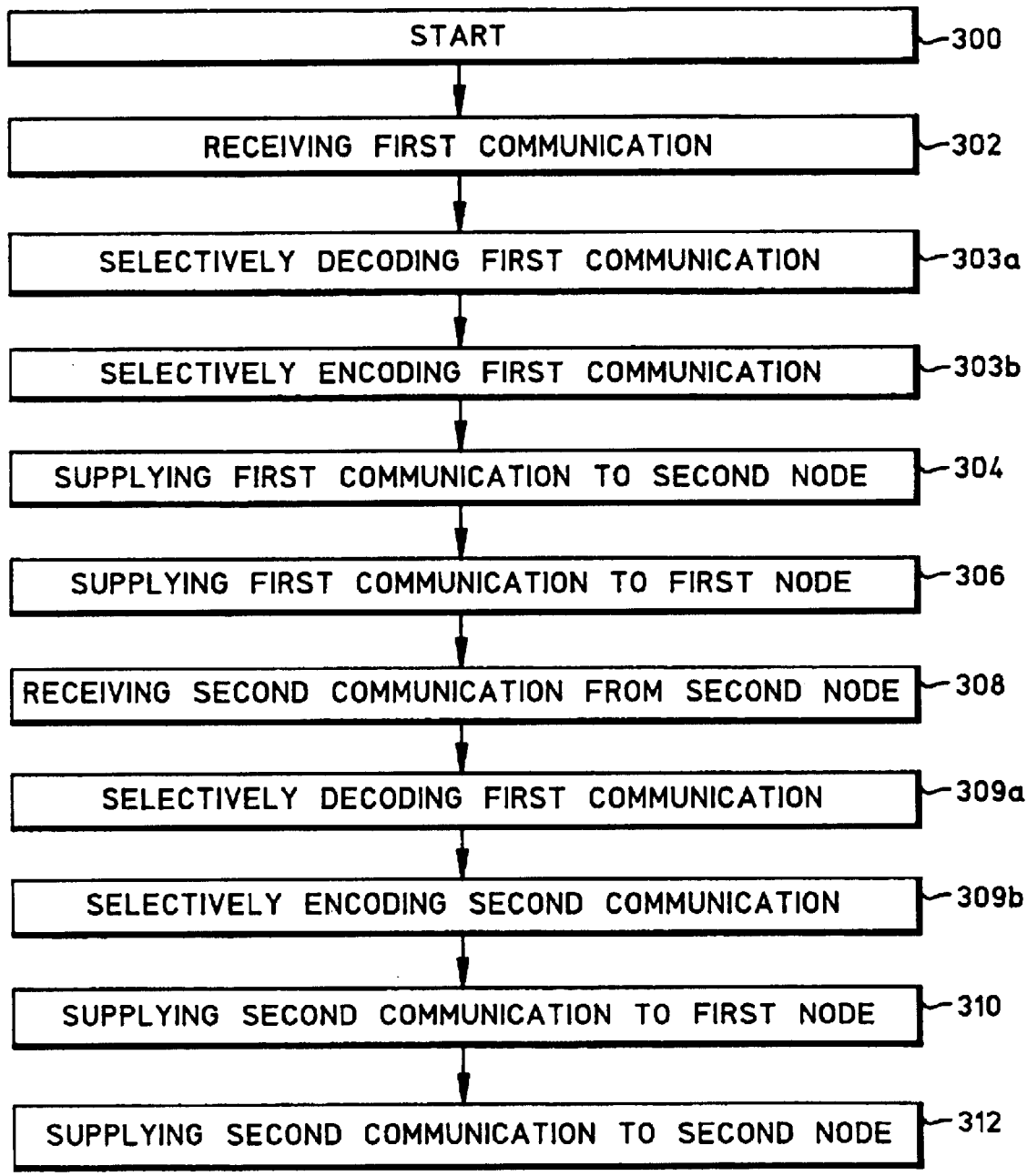
FIG. 6 is a flowchart depicting a method of forming a BLSR using a pair of IC digital communication relay devices.

FIG. 6 is a flowchart depicting a method of forming a BLSR using a pair of IC digital communication relay devices. The method begins with Step 300. Step 302 receives a first communication from a first node. In a first mode of operation, Step 304 supplies the first communication to a second node. In a second mode of operation, Step 306 supplies the first communication to the first node. Step 308 receives a second communication from the second node. In the first mode of operation, Step 310 supplies the second communication to the first node. In the second mode of operation, Step 312 supplies the second communication to the second node.

In some aspects of the invention, Step 303a selectively decodes the first communication. Step 303b selectively encodes the first communication.

In some aspects of the invention, Step 309a selectively decodes the second communication. Step 309b selectively encodes the second communication.

The advantage of this invention is that it provides the user with the ability to create redundancy in the network, with a minimum of required space, power, and extra equipment. In addition, the invention makes installations easy to diagnose because of the integrated loopback functionality. The configurability offered by the invention allows savings in space, required test equipment, and cost of customer units. An example is presented of two relays connected to provide a redundant path in a ring network. However, the present invention concept, with the addition of other relay units, expands upon the above-described uses for such circuitry. Other variations and embodiments of the invention will occur to those skilled in the art.

We claim:

1. A bidirectional line switch ring (BLSR) system using a pair of integrated circuit (IC) relay devices, the system comprising:
   a first relay including:
      an input switch having a default input and a duplex input to receive communications, a control port to accept switch commands, and an output to supply the selected communications;
      a default output; and
      a duplex output connected to the default input; and
   a second relay including:
      an input switch having a default input and a duplex input to receive communications, a control port to accept switch commands, and an output to supply the selected communications;
      a default output; and
      a duplex output connected to the default input;
   wherein the duplex output of the first relay is connected to the duplex input of the second relay; and
   wherein the duplex output of the second relay is connected to the duplex input of the first relay.

2. The system of claim 1 in which the communications are organized in a digital frame structure including forward error correction (FEC);
   wherein the first relay further includes:
      a decoder having a input connected to the input switch output, the decoder supplying decoded and corrected communications at a decoder output;
   wherein the second relay further includes:
      a decoder having a input connected to the input switch output, the decoder supplying decoded and corrected communications at a decoder output.

3. The system of claim 2 wherein the first relay further includes:
   an encoder having an input connected to the decoder output, the encoder supplying encoded communications at an output connected to the first relay default output;
   wherein the second relay further includes:
      an encoder having an input connected to the decoder output, the encoder supplying encoded communications at an output connected to the second relay default output.

4. The system of claim 3 in which a first mode of operation is selected;
   wherein the first relay input switch control port accepts a command to select the default input, and wherein the first relay decodes, encodes, and supplies communications received on the input switch default input to the default output; and
   wherein the second relay input switch control port accepts a command to select the default input, and wherein the second relay decodes, encodes, and supplies communications received on the input switch default input to the default output.

5. The system of claim 3 in which a second mode of operation is selected;
   wherein the first relay input switch control port accepts a command to select the duplex input, wherein the first relay decodes and encodes the communications, and wherein the first relay supplies communications received on the input switch duplex input at the default output; and
   wherein the second relay input switch control port accepts a command to select the duplex input, wherein the second relay decodes and encodes the communications, and wherein the second relay supplies communications received on the input switch duplex input at the default output.

6. The system of claim 5 wherein the first relay default input accepts communications, and supplies the communications at the duplex output; and
   wherein the second relay input switch default input accepts communications, and supplies the communication at the duplex output.

* * * * *